(No Model.)

W. S. HOW.
COMBINED RASP AND SAW.

No. 289,104.  Patented Nov. 27, 1883.

WITNESSES:
Wm. A. Skinkle.
Alfred C. Newman.

INVENTOR:
Woodbury S. How
By his Attorneys
Baldwin, Hopkins & Peyton.

UNITED STATES PATENT OFFICE.

WOODBURY STORER HOW, OF PHILADELPHIA, PENNSYLVANIA.

COMBINED RASP AND SAW.

SPECIFICATION forming part of Letters Patent No. 289,104, dated November 27, 1883.

Application filed June 6, 1883. (No model.)

*To all whom it may concern:*

Be it known that I, W. STORER HOW, of Philadelphia, Pennsylvania, have invented a new and Improved Rasp, of which the following is a specification.

The object of my invention is to produce an effective abrading rasp or file which will rapidly reduce the surfaces to which it may be applied.

To this end my invention consists in an endless sectionless band of steel or other metal which traverses over pulleys and carries projections or teeth on its surface.

Figure 1:
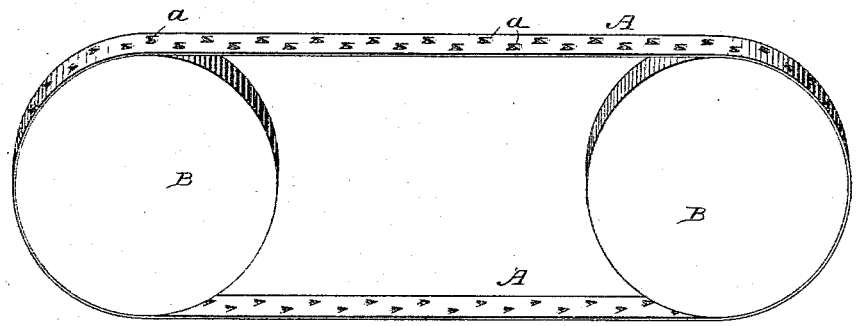

In the accompanying drawings, Figure 1 is a perspective view of an endless sectionless band or ribbon of steel, A, carrying a series of projections or teeth, $a$. The teeth are in this instance shown as formed of lips $a$, punched out so as to form a rough surface on both sides of the band, and the slits which form the lips preferably radiate from curved or round perforations, as shown at $a'$ in Fig. 2. The band traverses over pulleys B, which may be provided with a roughened periphery to prevent the band from slipping.

Figure 2:
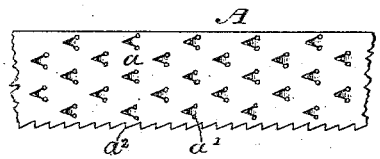

In Fig. 2 I have shown a section of a band-saw (provided with edge teeth $a^2$) carrying a series of projections or teeth, $a$, similar to those shown in Fig. 1. In this instance the slits which form the lips radiate from perforations $a'$, which prevent the band from splitting. The band-saw, with the exception of my improved rasp-surface, is of ordinary construction, and may be mounted in well-known ways.

Figure 3:
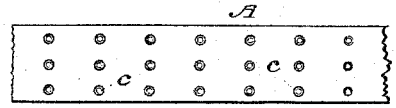
Figure 4:

Figs. 3 and 4 show sections of a band or belt, of suitable material, with perforations $b$, in which are inserted hard teeth $c$, to form a series of burrs or teeth on the surface of the band. The teeth may be held in place by a screw-thread formed thereon or by heading the ends or by other suitable means. The burrs or teeth may be varied in form and arrangement according to the character of work to be done. The pulleys are mounted in suitable bearings and revolved in any ordinary manner.

I am aware that endless bands of flexible material coated with an abrading substance are old, and also that a "finishing-machine" containing an endless series of hinged plates with cutting-surfaces is old, and therefore do not claim such subject-matter.

The right to hereafter file other applications for any matter described or illustrated in this application and not fully claimed is reserved.

I claim as my invention—

1. A rasp consisting of an endless sectionless belt or band with abrading metallic teeth or burrs on its flat surface, substantially as set forth.

2. A rasp consisting of an endless sectionless belt or band carrying abrading burrs or teeth on its flat outer side, substantially as specified.

3. A rasp consisting of a continuous metallic belt or band with teeth or burrs formed integrally therewith on its outer surface, substantially as described.

4. The herein-described combined band-saw and rasp, substantially as hereinbefore described.

In testimony whereof I have hereunto subscribed my name this 2d day of June, A. D. 1883.

WOODBURY STORER HOW.

Witnesses:
A. D. LYNE,
JOHN URIAN.